(12) United States Patent
Liu et al.

(10) Patent No.: US 11,960,050 B1
(45) Date of Patent: Apr. 16, 2024

(54) FUSION METHOD OF SATELLITE-BASED AND GROUND-BASED LIGHTNING DATA

(71) Applicant: Nanjing Meteorological Science and Technology Innovation Research Institute, Nanjing (CN)

(72) Inventors: Yan Liu, Nanjing (CN); Jie Zhu, Beijing (CN); Zheng Li, Nanjing (CN); Meirong Yang, Zhengzhou (CN); Hongbin Wang, Nanjing (CN); Duanyang Liu, Nanjing (CN); Fanchao Lv, Nantong (CN); Sulin Jiang, Nanjing (CN); Fengjiao Chen, Hefei (CN)

(73) Assignee: Nanjing Joint Institute for Atmospheric Sciences, Nanjing (CN)

( * ) Notice: Subject to any disclaimer, the term of this patent is extended or adjusted under 35 U.S.C. 154(b) by 0 days.

(21) Appl. No.: 18/349,972

(22) Filed: Jul. 11, 2023

(30) Foreign Application Priority Data

Feb. 15, 2023 (CN) .......................... 202310113967.X

(51) Int. Cl.
*G01W 1/16* (2006.01)
*G01R 29/08* (2006.01)

(52) U.S. Cl.
CPC .................................. *G01W 1/16* (2013.01)

(58) Field of Classification Search
CPC ........... G01W 1/16; G01W 1/10; G01W 1/02; G01W 1/00; G01W 2001/006; G01W 2203/00; G01W 2201/00; Y02A 90/10; Y02A 50/00; G01R 29/0842; Y02D 30/70; G06F 16/29; G06F 18/25; G06F 30/20
USPC .................... 73/170.24, 170.16; 324/72, 694; 340/601, 539.28, 995.1; 342/460, 26 R, 342/357.31; 701/468, 8; 702/4, 3, 189, 702/2, 1, 5
See application file for complete search history.

(56) References Cited

U.S. PATENT DOCUMENTS

| 6,215,294 B1 * | 4/2001 | Coleman ............ G01R 29/0842 324/76.19 |
| 2019/0196062 A1 * | 6/2019 | Coleman ................. G01W 1/16 |

FOREIGN PATENT DOCUMENTS

| CN | 115267943 A | * | 11/2022 |
| CN | 115616342 A | * | 1/2023 |
| CN | 116054110 A | * | 5/2023 |

* cited by examiner

*Primary Examiner* — Jeffrey P Aiello

(57) ABSTRACT

A fusion method of satellite-based and ground-based lightning data includes S1, selecting valid data in the satellite-based and ground-based lightning data; S2, determining a time threshold for fusing the satellite-based and ground-based lightning data; S3, determining a spatial threshold for fusing the satellite-based lightning data and the ground-based lightning data; and S4, constructing a data fusion scheme to obtain a fused all lightning data set.

6 Claims, 2 Drawing Sheets

US 11,960,050 B1

FUSION METHOD OF SATELLITE-BASED AND GROUND-BASED LIGHTNING DATA

TECHNICAL FIELD

The application belongs to the technical field of meteorological detection data, and in particular relates to a data fusion method based on satellite-based lightning detection data and ground-based lightning detection data.

BACKGROUND

There are two main ways to obtain large-scale all lightning (including cloud flashes and cloud-to-ground lightning) data: ground-based lightning detection based on lightning electromagnetic radiation transmission theory and satellite-based lightning imaging based on optical transmission theory. In China, the VLF/LF three-dimensional lightning locator is mostly used for the ground-based lightning detection. Since 2013, there are currently more than 400 stations in China, covering most land areas in China. Satellite-based lightning detection is carried on China's first self-developed FY-4A satellite and may detect all lightning in Asia and Oceania from an altitude of 35800 km, which marks a new starting point for lightning detection in China. The electromagnetic pulses of cloud-to-ground lightning radiation is mainly concentrated in VLF section, while the electromagnetic pulses of cloud flash radiation is mostly concentrated in the high frequency band above 1 MHZ, which makes the ground-based VLF/LF three-dimensional lightning locator have high detection efficiency for cloud-to-ground lightning, and some cloud flash data cannot be captured. Moreover, the ground-based lightning locators are easily influenced by the underlying surface, and it is difficult to arrange ground-based lightning locators in some areas (water areas and deserts), and the topography also interferes with the propagation of electromagnetic radiation, resulting in regional differences in lightning detection efficiency. Satellite-based lightning imager detects lightning from top to bottom, is more sensitive to cloud flashes, but often misses weak cloud-to-ground lightning. In addition, satellite-based lightning detection relies on the principle of optical imaging, the energy, duration and temporal and spatial characteristics of optical signals are easily disturbed by clouds, and thereby the accuracy of lightning detection and location is directly affected. Therefore, at present, alone satellite-based lightning detection or alone ground-based lightning detection cannot obtain perfect and accurate lightning information, and the detection information of the satellite-based lightning detection and ground-based lightning detection needs to complement each other. It is of great significance to fuse the new satellite-based lightning detection data with the traditional ground-based lightning detection data to truly reflect the holographic information of lightning. However, due to the short running time of FY-4A satellite in orbit, there is no fusion method of satellite-based lightning data and ground-based lightning data at present.

Ground-based lightning detection monitors lightning by analyzing the electromagnetic signals radiated by lightning. Satellite-based lightning detection, based on the optical radiation characteristics of lightning, distinguishes lightning signals from background noise to capture and locate lightning. Satellite-based lightning detection system and ground-based lightning detection system are different in theory, technology and methods, and also in lightning detection types, detection efficiency and temporal and spatial accuracy. Therefore, it is urgent to develop an effective collaborative analysis method for satellite and ground multi-source lightning detection data, explore the matching characteristics of the two types of data, carry out cross-research and fusion application to make up for the data incompleteness and uncertainty caused by a single information source, and thus more comprehensively understand the lightning activity characteristics.

SUMMARY

An objective of the present application is to provide a fusion method of satellite-based and ground-based lightning data, which fuses the satellite-based lightning data and the ground-based lightning data and make up for data incompleteness and uncertainty caused by a single information source, so as to understand lightning activity characteristics more comprehensively. The fused all lightning data may be applied to lightning monitoring and early warning, severe convective weather analysis, lightning disaster investigation and identification and lightning protection design, and thereby provides scientific support for lightning protection and disaster reduction business services and scientific research.

To achieve the above objective, the present application adopts a following technical scheme.

A fusion method of satellite-based and ground-based lightning data includes following steps:

S1, selecting valid data in the satellite-based and ground-based lightning data: selecting group products of satellite-based lightning, and data of cloud-to-ground lightning return strokes as well as cloud flash pulses received by a ground-based VLF/LF three-dimensional lightning locator as valid data for fusing, wherein the data of the cloud-to-ground lightning return strokes and the cloud flash pulses received by the ground-based VLF/LF three-dimensional lightning locator include occurrence times, positions and lightning current intensities;

S2, determining a time threshold for fusing the satellite-based and ground-based lightning data:

determining a difference of longitudes and latitudes to 0.2°, within a range of 0.02 s to 2 s, changing time window values with a time resolution of the satellite-based lightning data as a progressive speed, and calculating a matching degree MP between the satellite-based lightning data and the ground-based lightning data under specified time and space windows, and taking a change inflection point of the matching degree MP as the time threshold, wherein the matching degree is obtained by a following formula:

$$MP = \frac{G_S}{G} \times 100\%,$$

wherein the matching degree MP represents a ratio of a number of group products matched with at least one of the cloud-to-ground lightning return strokes or cloud flash pulses to a total number of the group products detected by the satellite-based lightning under the specified time and space window, and $G_S$ is the number of the group products matched with at least one of the cloud-to-ground lightning return strokes or the cloud flash pulses; G is the total number of the group products detected by the satellite-based lightning;

S3, determining a spatial threshold for fusing the satellite-based and ground-based lightning data:

lightning usually occurs in thunderstorm clouds with a radar echo intensity greater than 35 decibels of Z (dBZ). Therefore, in the application, isolated thunderstorm system with a maximum echo intensity greater than 35 dBZ is selected by using the meteorological radar echo characteristics, and the group products of satellite-based lighting, the return strokes of the cloud-to-ground lightning and cloud flash pulse data corresponding to the thunderstorm system are counted respectively within 6 minutes (min) after the echo. When lightning times detected by a satellite-based system and lightning times detected by a ground-based system are greater than or equal to 2 times respectively, the lightning is considered as an effective isolated thunderstorm system;

selecting samples from an isolated thunderstorm system, and calculating centroid distances between lightning clusters detected by satellite-based and ground-based lightning detection systems in an evolution process of same the thunderstorm system, and taking a distance corresponding to an 80th percentile as the spatial threshold; and S4, based on the time threshold and the spatial threshold determined in the S2 and S3 respectively, considering ground-based lightning data and satellite-based lightning data within the time threshold and the spatial threshold to be overlapped, eliminating the satellite-based lightning data overlapped, and merging remaining satellite-based lightning data with the ground-based lightning data to obtain a fused all lightning data set.

In an embodiment, the satellite-based lightning data come from lightning imaging products released by a FY-4A satellite in China, and the group products in the satellite-based lightning data are selected as the valid data.

In an embodiment, in the S3, a number of the selected samples of the isolated thunderstorm system ≥100.

In an embodiment, in the S2, the progressive speed of the time window is 0.02 s.

In an embodiment, in the S4, obtaining the fused all lightning data set includes following steps:

(1) dividing a target area into grid points of m rows and n columns according to the longitudes and the latitudes, and interpolating the ground-based lightning data into uniform grids according to a minimum distance method, denoted as $A=(a_{ij})$;

(2) eliminating the overlapped data: calculating longitude and latitude distances and time intervals between satellite-based group products and the data of the cloud-to-ground lightning return strokes and the cloud flash pulses in each of the grids, and eliminating group products smaller than the time threshold and the spatial threshold in calculation results; and (3) superimposing the satellite-based and ground-based lightning data according to the grid points, interpolating remaining satellite-based group products into spatial grids according to the minimum distance method, denoted as $B=(b_{ij})$ where lightning data in each of the grid points, whether detected by a satellite base or captured by a ground base, are marked as the valid data as long as lightning occurs, that is, a logical operation of a union set is adopted, and fused all lightning data are recorded as C, then a number of all lightning in each of the grid points is:

$$C = A + B = \begin{bmatrix} a_{11}+b_{11} & a_{12}+b_{12} & \ldots & a_{1n}+b_{1n} \\ a_{21}+b_{21} & a_{22}+b_{22} & \ldots & a_{2n}+b_{2n} \\ \ldots & \ldots & \ldots & \ldots \\ a_{m1}+b_{m1} & a_{m2}+b_{m2} & \ldots & a_{mn}+b_{mn} \end{bmatrix}.$$

Compared with prior art, the embodiments of the application have following advantages.

Firstly, the satellite-based lightning data and the ground-based lightning data in China are aggregated and optimized to the maximum extent, the completeness of all lightning information is improved, and information incompleteness caused by using lightning data from single source is avoided; and secondly, by calculating the time threshold and the spatial threshold in the target area, it is helpful to formulate a regional targeted fusion method, so that lightning activity characteristics of the target area are accurately reflected, and the phenomenon of one size fits all is avoided.

DETAILED DESCRIPTION OF EMBODIMENTS

Figure 1:
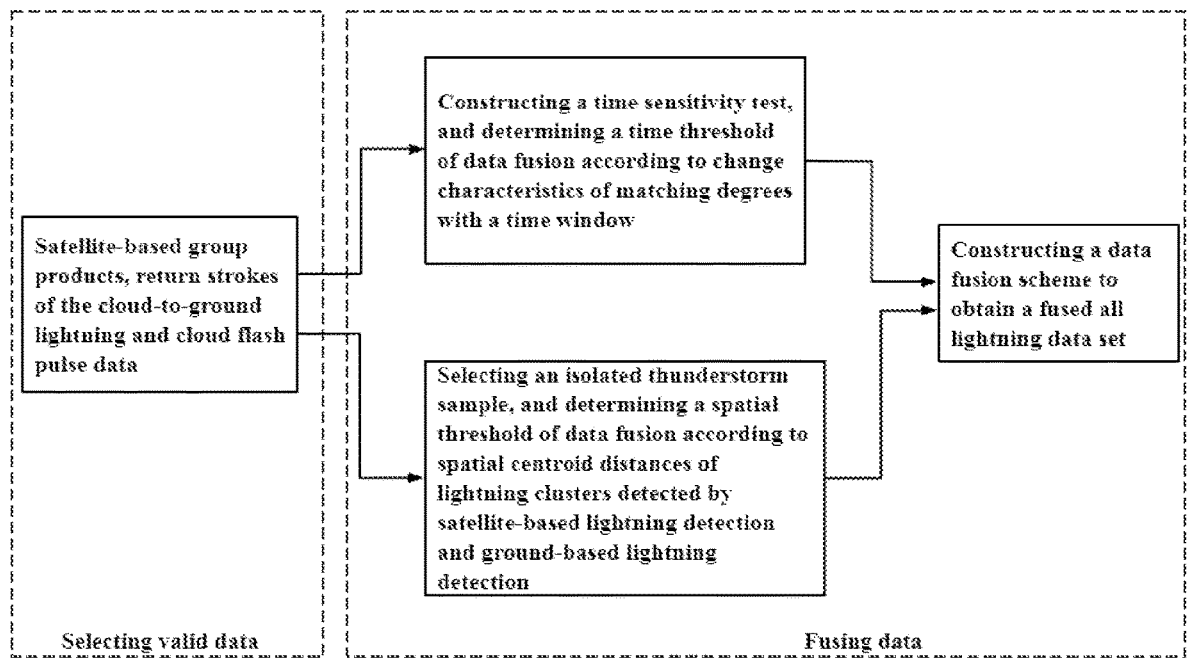
FIG. 1 is a schematic flow chart of a fusion method of satellite-based and ground-based lightning data.

The technical schemes of the present application are clearly and completely described below with reference to the drawings, and it is clear that the described embodiments are a part of the embodiments of the present application, and not all of them. Based on the embodiments in the present application, all other embodiments obtained by a person of ordinary skill in the art without making creative labor fall within the scope of protection of the present application.

The application provides a data fusion method based on satellite-based lightning detection data and ground-based lightning detection data. In the method, a sensitivity test is designed to calculate matching degrees of satellite-based lightning data and ground-based lightning data with different time granularity; at the same time, spatial difference between the satellite-based lightning data and the ground-based lightning data in observing a thunderstorm system is compared, so as to establish a threshold of the time window and the space window of consistency analysis between the satellite-based lightning data and the ground-based lightning data; lightning data within the threshold is classified as repeated detection data, and lightning detection data outside the threshold is used as supplementary data. The method specifically includes: S1, selecting valid data from the satellite-based lightning data and the ground-based lightning data; S2, calculating a time threshold for fusing the satellite-based lightning data and the ground-based lightning data; S3, calculating a spatial threshold for fusing the satellite-based lightning data and the ground-based lightning data; and S4, constructing a data fusion scheme to obtain a localized all lightning data set.

S1: Selecting the Valid Data from the Satellite-Based Lightning Data and the Ground-Based Lightning Data Lightning data released by FY-4A satellite in China are L2 quantitative products "event" and "group", and lightning data detected by ground-based VLF/LF three-dimensional lightning locator in China are data of cloud-to-ground lightning return strokes and cloud flash pulses. The satellite-based lightning mapping imager compares radiation after background dimming with threshold, extracts pixels that exceed the threshold and determines the pixels as events, where the event is the most basic lightning signal unit. On the basis, the group products are generated by a spatial-temporal clustering algorithm. The ground-based VLF/LF three-dimensional lightning locator records time, positions and lightning current intensities of the return strokes of the cloud-to-ground lightning and cloud flash pulses after stepped leader by receiving VLF/LF signals radiated by the return strokes of the cloud-to-ground lightning and the cloud flash pulses. By comparing characteristics of the two data products, namely the group products and the data of the cloud-to-ground lightning return strokes and cloud flash pulses, the group products in the satellite-based lightning data correspond to one of the cloud-to-ground lightning return strokes or one of the cloud flash pulses and are in line with the data fusion needs of the application. Therefore, the group products in the satellite-based lightning data, the cloud-to-ground lightning return strokes and the cloud flash pulses are used for data fusion.

S2: Calculating the Time Threshold for Fusing the Satellite-Based Lightning Data and the Ground-Based Lightning Data When detecting the group products, a time resolution of the FY-4A satellite lightning mapping imager in China is 0.02 second (s); when detecting the cloud-to-ground lightning return strokes and the cloud flash pulses, a time resolution of the ground-based 3D lightning locator is much higher than the time resolution of satellite-based detection/the FY-4A satellite lightning mapping imager and may reach 10-7 s at maximum. Therefore, a change range of the time window is adjusted to be between 0.02 s and 2 s by combining the time resolution of the FY-4A satellite lightning mapping imager and the time resolution of the ground-based 3D lightning locator. Considering that a spatial resolution of the satellite-based lightning mapping imager is 7.8 kilometers (km) at a sub-satellite point and may reach 20 km at the edge at maximum. Therefore, differences of longitudes and latitudes is fixed at 0.2°, and time window values are changed at a progressive speed of 0.02 s from 0.02 s to 2 s, and the matching degree (MP) between the satellite-based lightning data and the ground-based lightning data under the specified time and space window are calculated, and a change inflection point of the matching degree MP is taken as the time threshold, where the matching degree is obtained by a following formula.

$$MP = \frac{G_S}{G} \times 100\%,$$

where the matching degree MP represents a ratio of a number of group products matched with at least one of the cloud-to-ground lightning return strokes or cloud flash pulses to a total number of the group products detected by the satellite-based lightning under the specified time and space window, and $G_S$ is the number of the group products matched with at least one of the cloud-to-ground lightning return strokes or the cloud flash pulses; G is the total number of the group products detected by the satellite-based lightning.

S3: Calculating the Spatial Threshold for Fusing the Satellite-Based Lightning Data and the Ground-Based Lightning Data A meteorological radar is the most powerful monitoring method for severe convective weather, and radar echo characteristics effectively characterize dynamic and microphysical characteristics of thunderstorms. Researches show that lightning usually occurs in thunderstorm clouds with a radar echo intensity greater than 35 dBZ. Therefore, in the application, isolated thunderstorm systems with a maximum echo intensity greater than 35 dBZ are selected by using the meteorological radar echo characteristics, and the group products of satellite-based lighting, the return strokes of the cloud-to-ground lightning and cloud flash pulse data corresponding to the thunderstorm system are counted respectively within 6 min after the echo. When lightning times detected by a satellite-based system and lightning times detected by a ground-based system are greater than or equal to 2 times respectively, the lightning is considered as an effective isolated thunderstorm system.

Then, samples of the isolated thunderstorm system (a number of the samples is greater than or equal to 100) are selected, and centroid distances between lightning clusters detected by a satellite-based lightning detection system and a ground-based lightning detection system in an evolution process of the thunderstorm system are calculated. Considering redundancy of data, a distance corresponding to the 80th percentile is set as the spatial threshold.

S4: Constructing the Data Fusion Scheme to Obtain the Localized all Lightning Data Set The time threshold and the spatial threshold for fusing the satellite-based lightning data and the ground-based lightning data are obtained by the S2 and the S3. Ground-based lightning data and satellite-based lightning data within the time threshold and the spatial threshold are considered to be overlapped, and the overlapped satellite-based lightning data are eliminated, and remaining satellite-based lightning data are merged with the ground-based lightning data to obtain fused all lightning data set. Specific processes are as follows:

(1) preprocessing spatial grid points: dividing a target area into grid points of m rows and n columns according to the longitude and the latitude, and interpolating the ground-based lightning data into uniform grids according to a minimum distance method, denoted as $A=(a_{ij})$;

(2) eliminating the overlapped data: calculating longitude and latitude distances and time intervals between the group products of satellite-based and the data of the cloud-to-ground lightning return strokes and the cloud flash pulses in each of the grids, and eliminating group products smaller than the time threshold and the spatial threshold in calculation results; and (3) superimposing the satellite-based and ground-based lightning data according to the grid points, interpolating remaining satellite-based group products into spatial grids according to the minimum distance method, denoted as $B=(b_{ij})$ where lightning data in each of the grid points, whether detected by the satellite-based or captured by ground-based, are marked as the valid data as long as lightning occurs, that is, a logical operation of a union set is adopted, and fused all lightning data are recorded as C, then a number of all lightning in each of the grid points is:

$$C = A + B = \begin{bmatrix} a_{11}+b_{11} & a_{12}+b_{12} & \ldots & a_{1n}+b_{1n} \\ a_{21}+b_{21} & a_{22}+b_{22} & \ldots & a_{2n}+b_{2n} \\ \ldots & \ldots & \ldots & \ldots \\ a_{m1}+b_{m1} & a_{m2}+b_{m2} & \ldots & a_{mn}+b_{mn} \end{bmatrix}.$$

Embodiment

The following is an example of Jiangsu province from 2019 to 2022, and steps are shown in FIG. 1.

S1: Selecting the Valid Data from the Satellite-Based Lightning Data and the Ground-Based Lightning Data The lightning data released by FY-4A satellite in China are L2 quantitative products "event" and "group", and lightning data detected by ground-based VLF/LF three-dimensional lightning locator in China are data of cloud-to-ground lightning return strokes and cloud flash pulses. Satellite-based group products, data of the cloud-to-ground lightning return stroke and cloud flash pulses in Jiangsu province from 2019 to 2022 are selected, and missing data and wrong data are eliminated to form a valid data set.

Figure 2:
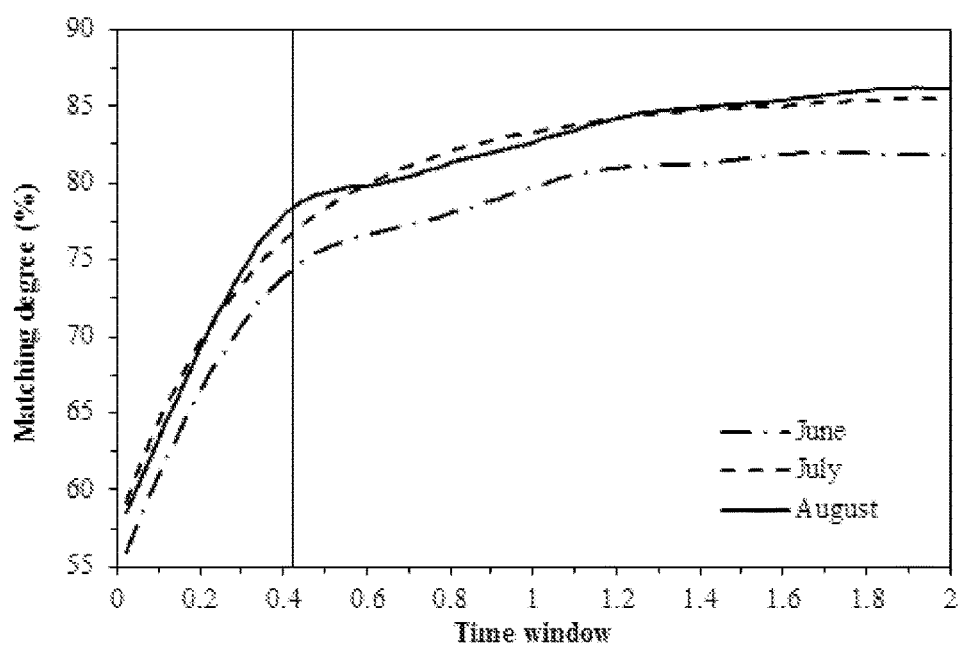
FIG. 2 shows change trend curves of matching degree with a time window in an embodiment of the present application.

S2: Calculating the Time Threshold for Fusing the Satellite-Based Lightning Data and the Ground-Based Lightning Data The space window is fixed at 0.2°, and the time window values are changed with a granularity of 0.02 s from 0.02 s to 2 s, and trend curves of the matching degree changing with the time window are shown in FIG. 2. It can be seen that the time window corresponding to the change inflection point of the matching degree is 0.42 s, so 0.42 s is determined as the time threshold for fusing the satellite-based lightning data and the ground-based lightning data.

S3: Calculating the Spatial Threshold for Fusing the Satellite-Based Lightning Data and the Ground-Based Lightning Data 304 samples of the isolated thunderstorm system are selected, centroid distances between the lightning clusters detected by the satellite-based lightning detection system and the ground-based lightning detection system in the isolated thunderstorm system are calculated, and percentile values are shown in Table 1.

TABLE 1

Percentile of the centroid distances between the lightning clusters detected by the satellite-based lightning detection system and the ground-based lightning detection system

| Hundredth/% | P10 | P50 | P60 | P70 | P80 | P90 | P99 |
|---|---|---|---|---|---|---|---|
| Percentile/° | 0.05 | 0.11 | 0.14 | 0.16 | 0.21 | 0.33 | 0.62 |

It can be seen that one centroid distance corresponding to the 80th percentile is 0.21°, so 0.21° is determined as the spatial threshold for fusing the satellite-based lightning data and ground-based lightning data.

S4: Constructing the Data Fusion Scheme to Obtain the Localized all Lightning Data Set According to the S2 and the S3, the time window and the space window for fusing the satellite-based lightning data and the ground-based lightning data are 0.42 s and 0.21° respectively. Ground-based lightning data and satellite-based lightning data within the time threshold and the spatial threshold are considered to be overlapped, and the overlapped satellite-based lightning data are eliminated, and remaining satellite-based lightning data are merged with the ground-based lightning data to obtain fused all lightning data set in Jiangsu province.

Figure 3:
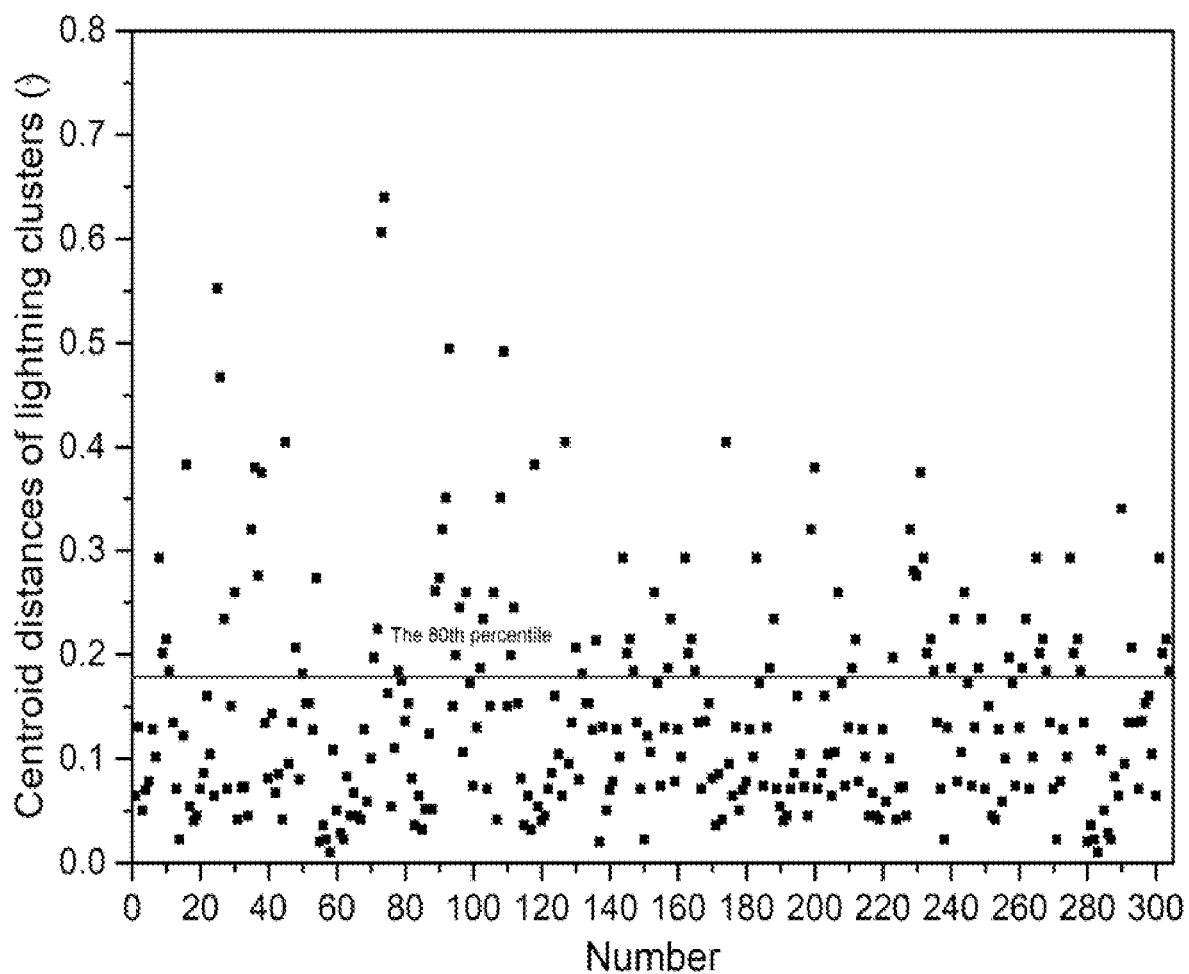
FIG. 3 shows centroid distances of lightning clusters obtained by satellite-based and ground-based detection in an embodiment of the application.

FIG. 2 shows the trend curves of the matching degree changing with the time windows in an embodiment of the present application. FIG. 3 shows the centroid distances of the lightning clusters obtained by satellite-based and ground-based detection in an embodiment of the application.

The application provides a fusion method of the satellite-based lightning data and the ground-based lightning data based on time-space matching, and in this way, lack of lightning data caused by a single lightning detection source is compensated to the maximum extent; therefore, it is helpful to obtain complete all lightning information. The method for determining the time window threshold and the space window threshold in the application is more targeted, and the calculation results may be used to understand the differences of the satellite-based lightning data and the ground-based lightning data in different regions in China, thus preventing a phenomenon of one size fits all.

It should be understood that the technical schemes of the present application are not limited to the limits of the above specific embodiments, and any technical variations made according to the technical solutions of the present application, without departing from the scope protected by the objective and claims of the present application, fall within the scope of protection of the present application.

What is claimed is:

1. A fusion method of satellite-based and ground-based lightning data,
comprising following steps:
step S1, selecting valid data in the satellite-based and ground-based lightning data: selecting group products of satellite-based lightning, and data of cloud-to-ground lightning return strokes as well as cloud flash pulses received by a ground-based VLF/LF three-dimensional lightning locator as valid data for fusing, wherein the data of the cloud-to-ground lightning return strokes and the cloud flash pulses received by the ground-based VLF/LF three-dimensional lightning locator comprise occurrence times, positions and lightning current intensities;

step S2, determining a time threshold for fusing the satellite-based and ground-based lightning data: determining a difference of longitudes and latitudes to 0.2°, within a range of 0.02 s to 2 s, changing time window values with a time resolution of the satellite-based lightning data as a progressive speed, and calculating a matching degree MP between the satellite-based lightning data and the ground-based lightning data under specified time and space windows, and taking a change inflection point of the matching degree MP as the time threshold, wherein the matching degree is obtained by a following formula:

$$MP = \frac{G_S}{G} \times 100\%,$$

wherein the matching degree MP represents a ratio of a number of group products matched with at least one of the cloud-to-ground lightning return strokes or cloud flash pulses to a total number of the group products detected by the satellite-based lightning under the specified time and space window, and $G_S$ is the number of the group products matched with at least one of the cloud-to-ground lightning return strokes or the cloud flash pulses; G is the total number of the group products detected by the satellite-based lightning;

step S3, determining a spatial threshold for fusing the satellite-based and ground-based lightning data: selecting samples from an isolated thunderstorm system, and calculating centroid distances between lightning clusters detected by satellite-based and ground-based lightning detection systems in an evolution process of same the thunderstorm system, and taking a distance corresponding to an 80th percentile as the spatial threshold; and step S4, based on the time threshold and the spatial threshold determined in the step S2 and step S3 respectively, considering ground-based lightning data and satellite-based lightning data within the time threshold and the spatial threshold to be overlapped, eliminating the satellite-based lightning data overlapped, and merging remaining satellite-based lightning data with the ground-based lightning data to obtain a fused all lightning data set;

wherein the method further comprises: applying the fused all lightning data set to provide lightning monitoring and early warning, severe convective weather analysis, lightning disaster investigation and identification, and/or lightning protection design.

2. The fusion method of the satellite-based and ground-based lightning data according to claim 1, wherein in the step S1, the satellite-based lightning data come from lightning imaging products released by a FY-4A satellite in China, and the group products in the satellite-based lightning data are selected as the valid data.

3. The fusion method of the satellite-based and ground-based lightning data according to claim 1, wherein in the step S3, a number of the selected samples of the isolated thunderstorm system ≥100.

4. The fusion method of the satellite-based and ground-based lightning data according to claim 1, wherein in the step S2, the progressive speed of the time window is 0.02 s.

5. The fusion method of the satellite-based and ground-based lightning data according to claim 1, wherein in the step S4, obtaining the fused all lightning data set comprises following steps:

(1) dividing a target area into grid points of m rows and n columns according to the longitudes and the latitudes, and interpolating the ground-based lightning data into uniform grids according to a minimum distance method, denoted as A=($a_{ij}$);

(2) eliminating the overlapped data: calculating longitude and latitude distances and time intervals between satellite-based group products and the data of the cloud-to-ground lightning return strokes and the cloud flash pulses in each of the grids, and eliminating group products smaller than the time threshold and the spatial threshold in calculation results; and (3) superimposing the satellite-based and ground-based lightning data according to the grid points, interpolating remaining satellite-based group products into spatial grids according to the minimum distance method, denoted as B=($b_{ij}$), wherein lightning data in each of the grid points, whether detected by a satellite base or captured by a ground base, are marked as the valid data as long as lightning occurs, that is, a logical operation of a union set is adopted, and fused all lightning data are recorded as C, then a number of all lightning in each of the grid points is:

$$C = A + B = \begin{bmatrix} a_{11}+b_{11} & a_{12}+b_{12} & \ldots & a_{1n}+b_{1n} \\ a_{21}+b_{21} & a_{22}+b_{22} & \ldots & a_{2n}+b_{2n} \\ \ldots & \ldots & \ldots & \ldots \\ a_{m1}+b_{m1} & a_{m2}+b_{m2} & \ldots & a_{mn}+b_{mn} \end{bmatrix}.$$

6. A fusion method of satellite-based and ground-based lightning data, comprising following steps:

step S1, selecting valid data in the satellite-based and ground-based lightning data: selecting group products of satellite-based lightning, and data of cloud-to-ground lightning return strokes as well as cloud flash pulses received by a ground-based VLF/LF three-dimensional lightning locator as valid data for fusing, wherein the data of the cloud-to-ground lightning return strokes and the cloud flash pulses received by the ground-based VLF/LF three-dimensional lightning locator comprise occurrence times, positions and lightning current intensities;

step S2, determining a time threshold for fusing the satellite-based and ground-based lightning data: determining a difference of longitudes and latitudes to 0.2°, within a range of 0.02 s to 2 s, changing time window values with a time resolution of the satellite-based lightning data as a progressive speed, and calculating a matching degree MP between the satellite-based lightning data and the ground-based lightning data under specified time and space windows, and taking a change inflection point of the matching degree MP as the time threshold, wherein the matching degree is obtained by a following formula:

$$MP = \frac{G_S}{G} \times 100\%,$$

wherein the matching degree MP represents a ratio of a number of group products matched with at least one of the cloud-to-ground lightning return strokes or cloud flash pulses to a total number of the group products detected by the satellite-based lightning under the specified time and space window, and $G_S$ is the number of the group products matched with at least one of the cloud-to-ground lightning return strokes or the cloud flash pulses; G is the total number of the group products detected by the satellite-based lightning;

step S3, determining a spatial threshold for fusing the satellite-based and ground-based lightning data: selecting samples from an isolated thunderstorm system, and calculating centroid distances between lightning clusters detected by satellite-based and ground-based lightning detection systems in an evolution process of same the thunderstorm system, and taking a distance corresponding to an 80th percentile as the spatial threshold;

step S4, based on the time threshold and the spatial threshold determined in the step S2 and step S3 respectively, considering ground-based lightning data and satellite-based lightning data within the time threshold and the spatial threshold to be overlapped, eliminating the satellite-based lightning data overlapped, and merging remaining satellite-based lightning data with the ground-based lightning data to obtain a fused all lightning data set; and step S5, applying the fused all lightning data set to provide lightning protection and disaster reduction business services.

\* \* \* \* \*